(12) United States Patent
Cheng

(10) Patent No.: US 11,057,891 B2
(45) Date of Patent: Jul. 6, 2021

(54) METHODS AND RELATED DEVICES FOR PERFORMING CROSS-CARRIER SCHEDULING WITH BEAM OPERATIONS

(71) Applicant: FG Innovation Company Limited, Tuen Mun (HK)

(72) Inventor: Yu-Hsin Cheng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 83 days.

(21) Appl. No.: 16/373,673

(22) Filed: Apr. 3, 2019

(65) Prior Publication Data

US 2019/0313390 A1    Oct. 10, 2019

Related U.S. Application Data

(60) Provisional application No. 62/655,493, filed on Apr. 10, 2018.

(51) Int. Cl.
*H04W 72/04* (2009.01)
*H04W 76/27* (2018.01)
(Continued)

(52) U.S. Cl.
CPC .......... *H04W 72/046* (2013.01); *H04W 8/24* (2013.01); *H04W 24/08* (2013.01);
(Continued)

(58) Field of Classification Search
CPC ....... H04W 72/04; H04W 8/24; H04W 72/12; H04L 5/00
See application file for complete search history.

(56) References Cited

U.S. PATENT DOCUMENTS

2014/0050191 A1\*  2/2014  Kim .................... H04L 5/0053
                                                    370/329
2016/0345301 A1\* 11/2016  Webb ................ H04W 72/0446
(Continued)

FOREIGN PATENT DOCUMENTS

CN         101998584 A      3/2011
CN          13973425 A      8/2014
(Continued)

OTHER PUBLICATIONS

Motorola R1-103168 Blind decoding and Search Spaces for Carrier Aggregation 3GPP TSG RAN WG1 Meeting #61 May 14, 2010 (May 14, 2010) the whole document.
(Continued)

*Primary Examiner* — Mohammad S Anwar
(74) *Attorney, Agent, or Firm* — ScienBiziP, P.C.

(57) ABSTRACT

A method for wireless communications is provided. The method, performed by a User Equipment (UE), includes receiving, on a first cell, a first search space configuration and a second search space configuration, and a portion of the second search space configuration being different from the first search space configuration; monitoring, on the first cell, a first Physical Downlink Control Channel (PDCCH) of the first cell, based on the first search space configuration; and monitoring, on the first cell, a second PDCCH of a second cell cross-carrier scheduled by the first cell, based on the second search space configuration.

16 Claims, 10 Drawing Sheets

(51) Int. Cl.
*H04W 88/02* (2009.01)
*H04W 24/08* (2009.01)
*H04W 8/24* (2009.01)
*H04W 72/12* (2009.01)
*H04L 5/00* (2006.01)

(52) U.S. Cl.
CPC ..... *H04W 72/042* (2013.01); *H04W 72/1257* (2013.01); *H04W 76/27* (2018.02); *H04W 88/023* (2013.01); *H04L 5/001* (2013.01)

(56) References Cited

U.S. PATENT DOCUMENTS

2018/0227899 A1* 8/2018 Yu .................... H04B 17/318
2019/0141693 A1* 5/2019 Guo .................... H04B 7/00

FOREIGN PATENT DOCUMENTS

EP    3253154 A1   12/2017
WO    2012016414 A1   2/2012

OTHER PUBLICATIONS

Qualcomm Incorporated R1-1800868 Remaining issues on control resource set and search space 3GPP TSG RAN WG1 Meeting AH 1801 Jan. 26, 2018 (Jan. 26, 2018) the whole document.
Mediatek Inc. R1-1801663 Remaining issues of DLUL scheduling and HARQ management 3GPP TSG RAN WG1 Meeting #92 Mar. 2, 2018 (Mar. 2, 2018) section 2-4.

* cited by examiner

METHODS AND RELATED DEVICES FOR PERFORMING CROSS-CARRIER SCHEDULING WITH BEAM OPERATIONS

CROSS-REFERENCE TO RELATED APPLICATION(S)

The present application claims the benefit of and priority to a provisional U.S. Patent Application Ser. No. 62/655,493 filed on Apr. 10, 2018, entitled "Method and Apparatus for cross carrier scheduling in beam operation," (hereinafter referred to as "US73526 application"). The disclosure of the US73526 application is hereby incorporated fully by reference into the present application.

FIELD

The present disclosure generally relates to wireless communications, and more particularly, to methods and related devices for performing cross-carrier scheduling with beam operations.

BACKGROUND

Various efforts have been made to improve different aspects of wireless communications, such as data rate, latency, reliability and mobility, for the next generation (e.g., 5G New Radio (NR)) wireless communication systems. As a result of these efforts, the next generation wireless communication systems may provide a set of beam operations, by which User Equipments (UEs) and base stations (e.g., the next generation Node Bs (gNBs)) may establish one or more directional transmission links, for improved beamforming gains and quality of the communication.

Cross-carrier scheduling may also be used in the next generation wireless communication systems to reduce complexity when the UE performs Carrier Aggregation (CA) transmissions. However, cross-carrier scheduling with beam operations still presents challenges.

Therefore, there is a need in the art for an improved cross-carrier scheduling mechanism compatible with beam operations.

SUMMARY

The present disclosure is directed to methods and related devices for performing cross-carrier scheduling with beam operations.

According to an aspect of the present disclosure, a method for wireless communications is provided. The method, performed by a UE, includes receiving, on a first cell, a plurality of search space configurations from a base station, the plurality of search space configurations including a first search space configuration and a second search space configuration, and a portion of the second search space configuration being different from the first search space configuration; monitoring, on the first cell, a first Physical Downlink Control Channel (PDCCH) of the first cell, based on the first search space configuration; and monitoring, on the first cell, a second PDCCH of a second cell cross-carrier scheduled by the first cell, based on the second search space configuration. The portion of the second search space configuration differing from the first search space configuration comprises at least one of a number of PDCCH candidates of each Aggregation Level (AL); a monitoring periodicity; and a format of Downlink Control Information (DCI).

According to another aspect of the present disclosure, a UE is provided. The UE includes a one or more non-transitory computer-readable media having computer-executable instructions embodied thereon and at least one processor coupled to the one or more non-transitory computer-readable media. The at least one processor is configured to execute the computer-executable instructions to receive, on a first cell, a plurality of search space configurations from a base station, the plurality of search space configurations including a first search space configuration and a second search space configuration, and a portion of the second search space configuration being different from the first search space configuration; monitor, on the first cell, a first PDCCH of the first cell, based on the first search space configuration; and monitor, on the first cell, a second PDCCH of a second cell cross-carrier scheduled by the first cell, based on the second search space configuration, the portion of the second search space configuration differing from the first search space configuration including at least one of a number of PDCCH candidates of each AL; a monitoring periodicity; and a format of DCI.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
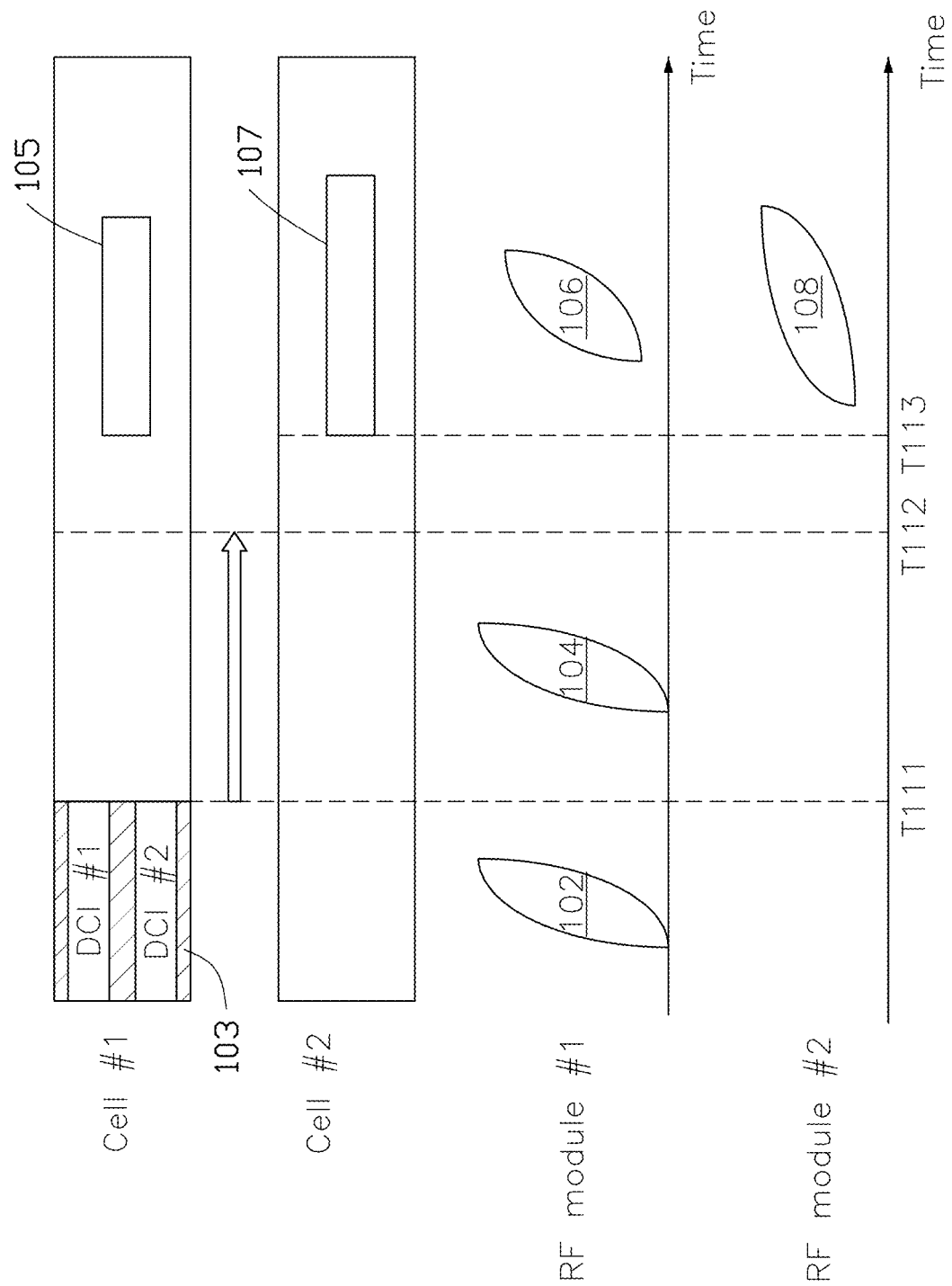
FIG. 1 is a schematic diagram illustrating a cross-carrier scheduling procedure performed with beam operations, in accordance with example implementations of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read Only Memory (CD ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an internet) through a Radio Access Network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A base station may include, but is not limited to, a Node B (NB) as in the UMTS, an evolved Node B (eNB) as in the LTE-A, a Radio Network Controller (RNC) as in the UMTS, a Base Station Controller (BSC) as in the GSM/GERAN, an NG-eNB as in an E-UTRA base station in connection with the 5GC, a gNB as in the 5G-AN, and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible configurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least DownLink (DL) transmission data, a guard period, and UpLink (UL) transmission data should be included. Additionally, the respective portions of the DL transmission data, the guard period, and the UL transmission data should also be configurable, for example, based on the network dynamics of NR. In addition, SL resource may also be provided in an NR frame to support ProSe services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

Cross-carrier scheduling may be used to reduce the UE complexity. With cross-carrier scheduling, the UE may receive a PDCCH on a Component Carrier (CC) (or called "a cell" in the present disclosure) other than a cell on which a PDSCH is received. For example, for a Secondary Cell (SCell) cross-carrier scheduled on a Primary Cell (PCell), the UE may receive the PDCCH of the SCell on the PCell, and use the scheduling information contained in the PDCCH to receive the PDSCH on the SCell. In such an example, the SCell is a cross-carrier scheduled cell (hereafter referred to as "a scheduled cell"), and the PCell is a cross-carrier scheduling cell (hereafter referred to as "a scheduling cell"). According to the general meaning, a scheduled cell may refer to a cell to be cross-carrier scheduled on other cell, and a scheduling cell may refer to a cell that carries cross-carrier scheduling information of other cells.

FIG. 1 is a schematic diagram illustrating a cross-carrier scheduling procedure performed with beam operations, in accordance with example implementations of the present disclosure. In the present implementation, a UE may expect that a base station may not transmit a PDSCH of a scheduled cell during a specific period of time (e.g., the scheduling offset period).

As shown in FIG. 1, the UE is configured to perform CA transmissions on a cell #1 and a cell #2. The UE may have an RF module #1 and an RF module #2 to receive the cell #1 and the cell #2, respectively. The cell #2 (e.g., a scheduled cell) may be cross-carrier scheduled on the cell #1 (e.g., a scheduling cell). In some implementations, the cell #2 may be an SCell, and the cell #1 may be a PCell or another SCell.

In the present implementation, the cell #1 may be configured with a Control Resource Set (CORESET) 103 by the base station. Furthermore, the UE may be configured with a Transmission Configuration Indicator (TCI) state (TCI-state) for the CORESET 103. The UE may apply a DL Reception (Rx) spatial filter (e.g., the DL Rx beam 102 provided by the RF module #1) corresponding to the TCI-state to monitor the CORESET 103.

The CORESET 103 may contain one or more PDCCHs that carry scheduling information of the cell #1 and/or the cell #2. For example, the scheduling information may be contained in Downlink Control Information (DCI). As shown in FIG. 1, the CORESET 103 may contain two PDCCHs. One of the PDCCHs may carry DCI #1, and another PDCCH may carry DCI #2. For example, the DCI #1 may contain scheduling information for a PDSCH 105 on the cell #1, and the DCI #2 may contain scheduling information for a PDSCH 107 on the cell #2.

After the UE successfully decodes the PDCCHs in the CORESET 103, the UE may know when to monitor the corresponding PDSCHs (e.g., the PDSCHs 105 and 107) and which DL Rx beam(s) should be used.

Generally, there may be a scheduling offset period between the time (e.g., the time T111) the UE completes the reception of the PDCCH(s) and the time (e.g., the time T112) the UE successfully decodes the PDCCH(s). In some implementations, the starting point of the scheduling offset period may be the next symbol of the end of the last symbol of the CORESET (e.g., the CORESET 103). Furthermore, the length of the scheduling offset period may be related to the UE's capabilities. For example, the UE may report the scheduling offset period as the UE's capability to the base station. In some implementations, the scheduling offset period is represented by a specific Information Element (IE) (e.g., "ThresholdSched-Offset").

During the scheduling offset period (e.g., between time T111 and time T112), because the UE has not successfully decoded the DCI #1 and DCI #2, the UE does not know the locations of the corresponding PDSCHs. In the present implementation, the UE may apply a DL Rx beam 104 to perform reception on the cell #1 during the scheduling offset period. The DL Rx beam 104 may be determined by predefined rules. For example, the UE may apply the same DL Rx spatial filter as the DL Rx beam 102 to perform reception on the cell #1 during the scheduling offset period. In such a case, the DL Rx beam 104 may be the same with the DL Rx beam 102. In another example, the DL Rx beam 104 may be determined based on the lowest CORESET ID in the latest time slot.

As mentioned above, in the present implementation, the UE may expect that there is no PDSCH transmission on the cell #2 during the scheduling offset period. Thus, the UE may start receiving the PDSCH 107 on the cell #2 only when the time offset period between the end of the PDCCH carrying the DCI #2 (e.g., at the time T111) and the beginning of the PDSCH 107 on the cell #2 (e.g., at the time T113) is larger than or equal to a predefined threshold (e.g., "ThresholdSched-Offset"). In some implementations, the predefined threshold may be 7, 14 or 28 symbols counting from the end of last symbol of the PDCCH to the beginning of the first symbol of the PDSCH, depending on the UE's capability.

After the time T112, because the UE has decoded the PDCCHs in the CORESET 103 successfully, the UE may follow the scheduling information of the DCI #2 to apply a DL Rx beam 108 to receive the PDSCH 107 on the cell #2. On the other hand, the UE may also follow the DCI #1 to apply a DL Rx beam 106 to receive the PDSCH 105 on the cell #1.

In some implementations, the method for performing cross-carrier scheduling with beam operations may be applied in multiple Transmission Reception Point (TRP) (multi-TRP) transmission. To support multiple-PDCCH based multi-TRP/panel transmission with intra-cell (same cell ID) and inter-cell (different Cell IDs), the following Radio Resource Control (RRC) configuration may be used to link multiple PDCCH/PDSCH pairs with multiple TRPs:

One CORESET in a "PDCCH-config" corresponds to one TRP.

In some of such implementations, if the base station schedules the PDSCH of a TRP #1 and a TRP #2 only on the CORESET of the TRP #1, the base station may configure two different TCI-states in the CORESET of the TRP #1, and the UE may monitor the PDSCH from the TRP #1 during the scheduling offset period by using a default DL Rx spatial filter. Meanwhile, the UE may assume there is no PDSCH transmission from the TRP #2 during the scheduling offset period. In some implementations, the abovementioned UE behavior may happen when the number of the scheduled cell(s) (or TRP(s)) on a cell (or a TRP) is larger than the UE's capability of the maximum number of simultaneous receptions.

Figure 2A:
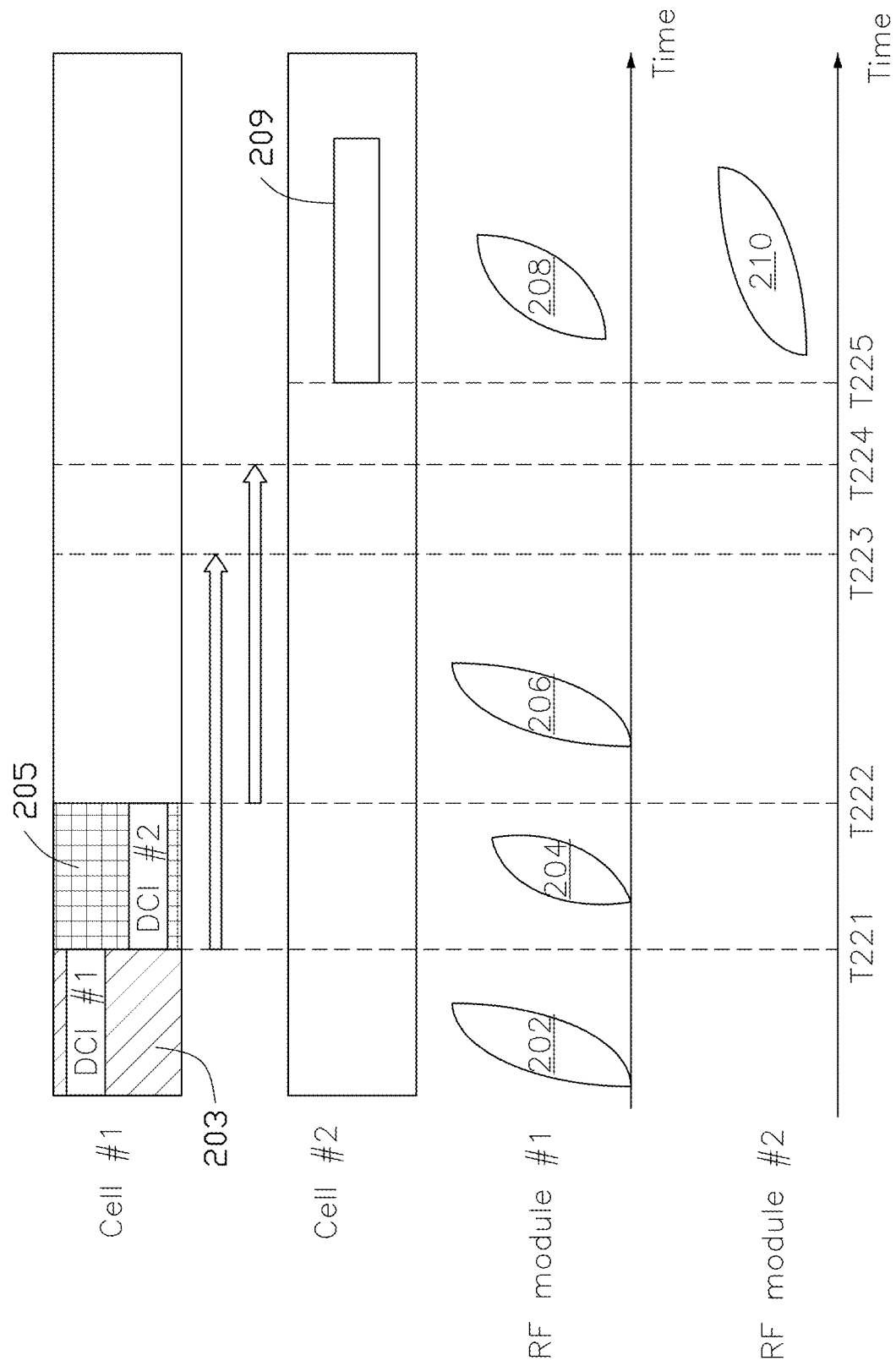
FIG. 2A is a schematic diagram illustrating a cross-carrier scheduling procedure performed with beam operations, in accordance with example implementations of the present disclosure.

FIG. 2A is a schematic diagram illustrating a cross-carrier scheduling procedure performed with beam operations, in accordance with example implementations of the present disclosure.

As shown in FIG. 2A, a UE is configured to perform CA transmissions on a cell #1 and a cell #2 of a base station, for example. The UE may have an RF module #1 and an RF module #2 to receive the cell #1 and the cell #2, respectively. The cell #2 (scheduled cell) may be cross-carrier scheduled on the cell #1 (scheduling cell). Since the cell #2 is a scheduled cell, the base station may not configure any CORESET on the cell #2.

In the present implementation, the UE may be configured with multiple CORESETs (e.g., a CORESET 203 and a CORESET 205) on the cell #1. The CORESET 203 may contain a PDCCH that carries the DCI #1. The UE may apply a DL Rx beam 202 to monitor the CORESET 203. On the other hand, the CORESET 205, which is located within the scheduling offset period (e.g., from the time T221 to the time T223) of the CORESET 203, may contain a PDCCH that carries the DCI #2. The UE may apply a DL Rx beam 204 to monitor the CORESET 205.

Each of the DL Rx beams 202 and 204 may correspond to a TCI-state of a TCI-state table in an RRC configuration. In some implementations, the RRC configuration of the cell #1 may be configured with a TCI-state table, while the RRC configuration of the cell #2 is not configured with any TCI-state table. Examples of the related RRC configurations are shown in Tables 1 and 2.

TABLE 1

| RRC Configuration of Cell #1 |
|---|
| RRC configuration of cell #1 |
| ControlResourceSet::{ |
| . |
| . |
| . |
|   - CORESETID |
|     - #1 |
|   - TCI-statesPDCCH: |
|     - TCI-state#1 |
|   - TCI-presentInDCI: |
|     - disable |
| . |
| . |
| . |
| } |
| ControlResourceSet::{ |
| . |
| . |
| . |
|   - CORESETID |
|     - #2 |
|   - TCI-statesPDCCH: |
|     - TCI-state#5 |
|   - TCI-presentInDCI: |
|     - enable |
| . |
| . |
| . |
| } |
| PDSCH-config::{ |
| . |
| . |
| . |
|   - TCI-state:{ |
|     . |
|     . |
|     . |
|     - TCI-stateID: |
|       - #10 |
|     - CellID: |
|       - Cell#2 |
|     - referenceSignal: |
|       CRI#10 |
|     . |
|     . |
|     . |
|   } |
| . |
| . |
| . |
| } |
| PDSCH-config::{ |
| . |
| . |
| . |
|   - TCI-state:{ |
|     . |
|     . |
|     . |
|     - TCI-stateID: |
|       - #1 |
|     - CellID: |
|       - Cell#1 |
|     - referenceSignal: |
|       - CRI#1 |
|     . |
|     . |
|     . |
|   } |
| . |
| . |
| . |
| } |
| PDSCH-config::{ |
| . |
| . |
| . |
|   - TCI-state:{ |

TABLE 1-continued

RRC Configuration of Cell #1

```
            .
            .
            .
        - TCI-stateID:
            - #5
        - CellID:
            - Cell#1
        - referenceSignal:
            - SSB#5
            .
            .
            .
    }
        .
        .
        .
}
```

TABLE 2

RRC Configuration of Cell #2

```
RRC configuration of cell #2
Crosscarrierscheduling::{
        .
        .
        .
    - schedulingCellID:
        - Cell#1
    - cif-InSchedulingCell:
        - 1
        .
        .
        .
}
```

As shown in the above, the RRC configuration of the cell #1 includes a TCI-state table containing at least three TCI-states with TCI-stateIDs=#1, #5 and #10, while the RRC configuration of the cell #2 is not configured with any TCI-state table.

In the present implementation, if the time offset period between the DCI #1 and the corresponding PDSCH is less than a predefined threshold (e.g., "ThresholdSched-Offset"), and there is a PDCCH overlaps with the PDSCH corresponding to the DCI #1 in at least one symbol, the UE may prioritize the reception of the PDCCH. As shown in FIG. 2A, the UE may apply the DL Rx beam 204, which is configured for the CORESET 205, to receive the CORESET 205. For example, the DL Rx beam 204 may correspond to a TCI-state (e.g., "TCI-state #5" in Table 1) configured in the configuration of the CORESET 205 (e.g., with CORE-SETID #2).

In some other implementations, the UE may apply a DL Rx spatial filter (e.g., the DL Rx beam 202) configured for the CORESET 203 to receive the CORESET 205. In some other implementations, if the TCI-state configuration (e.g., the TCI-state table) is not contained in the RRC configuration, the UE may follow the latest TCI-state applied for the CORESET for the scheduled cell (e.g., the cell #2), to determine the TCI-state of the scheduled cell when the UE receives an indication on the scheduled cell.

The DL Rx beam 202 and the DL Rx beam 204 may be determined by TCI-state IDs contained in the CORESET configuration (e.g., "ControlResourceSet"). For example, according to Table 1, the DL Rx beam 202 may be determined by the TCI-state #1, which is associated with the CRI #1, and the DL Rx beam 204 may be determined by the TCI-state #5, which is associated with the SSB #5.

During the time interval between the time T222 and the time T223, because the UE has not successfully decoded the DCI #1, the UE may follow predefined rules to determine the DL Rx spatial filter (e.g., the DL Rx beam 206) to perform reception on the cell #1. For example, the UE may apply the same DL Rx spatial filter as the DL Rx beam 202 to receive the cell #1 during this time interval.

On the other hand, during the scheduling offset period (e.g., from the time T222 and to the time T224) of the CORESET 205, the UE may expect that there is no PDSCH transmission on the cell #2. Thus, the UE may receive the PDSCH 209 on the cell #2 only when the time offset between the end of the PDCCH carrying the DCI #2 (e.g., at the time T222) and the beginning of the PDSCH 209 of the cell #2 (e.g., at the time T225) is larger than or equal to a predefined threshold (e.g., "ThresholdSched-Offset").

After the time T224, the UE may decode the DCI #1 and DCI #2 successfully. Examples of the DCI #1 and DCI #2 are shown in Tables 3 and 4, respectively.

TABLE 3

DCI #1

DL DCI of Cell #1
TCI state: #1
K0: 1 slot
.
.
.

TABLE 4

DCI #2

DL DCI of Cell #2
TCI state: #10
K0: 1 slot
.
.
.

In some implementations, when the UE may be not configured with a TCI-state table for the cell #2, the UE may refer to the TCI-state table of the cell #1 to determine the TCI-state for the cell #2. For example, according to Tables 1 and 4, the UE may determine that the TCI-state for the cell #2 is associated with the CRI #10. In such a case, the UE may apply the same spatial filter for receiving the CSI RS resource corresponding to the CRI #10 of the cell #2 to receive the PDSCH 209 on the cell #2. On the other hand, the UE may follow the DCI #1 to apply a DL Rx beam 208 (e.g., corresponding the TCI-state #1 associated with the CRI #1) to receive the corresponding PDSCH on the cell #1.

Figure 2B:
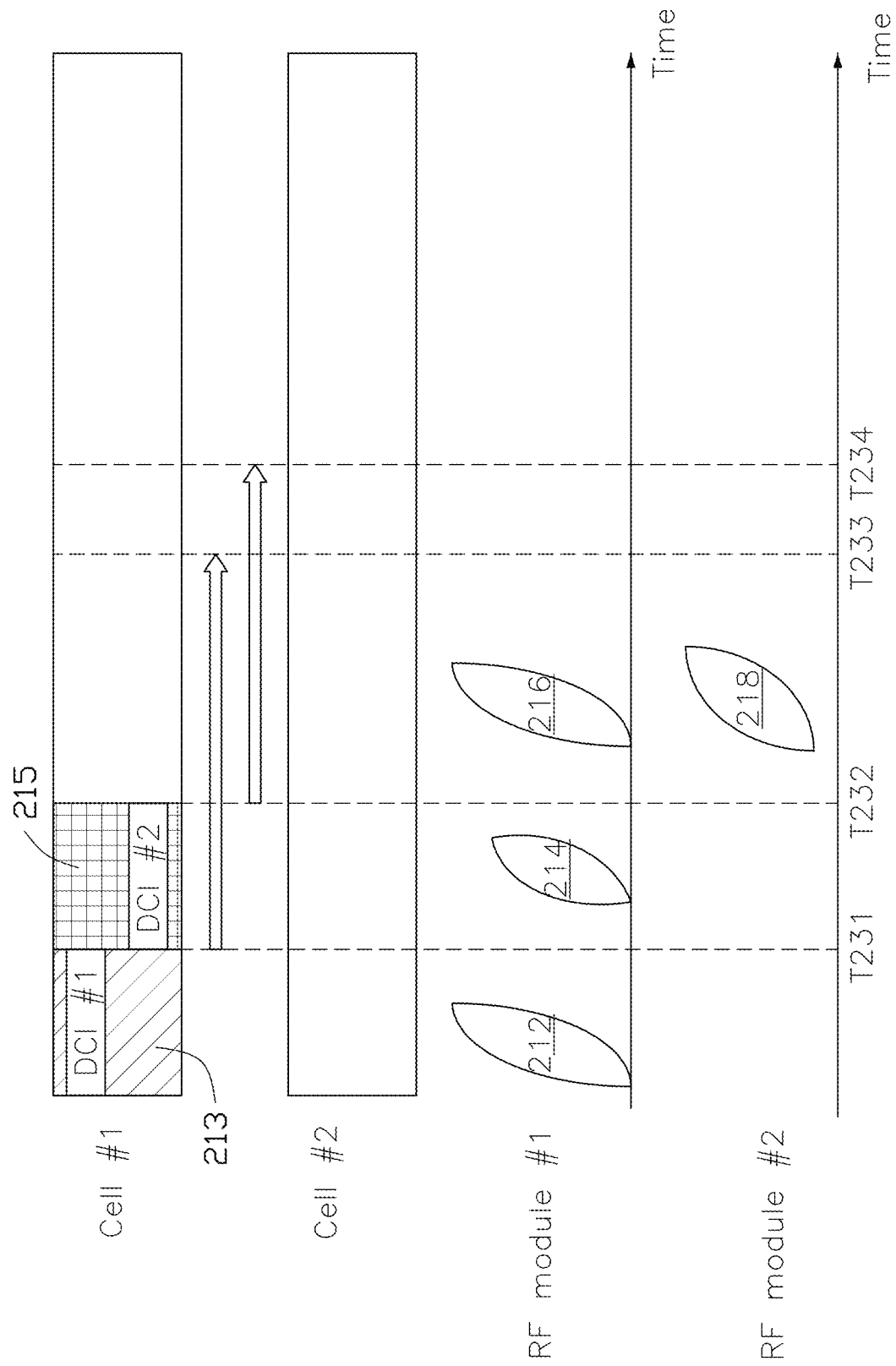
FIG. 2B is a schematic diagram illustrating a cross-carrier scheduling procedure performed with beam operations, in accordance with example implementations of the present disclosure.

FIG. 2B is a schematic diagram illustrating a cross-carrier scheduling procedure performed with beam operations, in accordance with example implementations of the present disclosure.

As shown in FIG. 2B, a UE is configured to perform CA transmissions on a cell #1 and a cell #2 of a base station, for example. The UE may have an RF module #1 and an RF module #2 to receive the cell #1 and the cell #2, respectively. The cell #2 (scheduled cell) may be cross-carrier scheduled on the cell #1 (scheduling cell). Since the cell #2 is a scheduled cell, the base station may not configure any CORESET configuration on the cell #2.

In the present implementation, the UE may be configured with multiple CORESETs (e.g., a CORESET 213 and a CORESET 215). The CORESET 213 may contain a PDCCH that carries the DCI #1. The UE may apply a DL Rx beam 202 to monitor the CORESET 213. On the other hand, the CORESET 215, which is located within the scheduling offset period (e.g., from the time T231 to the time T233) of the CORESET 213, may contain a PDCCH that carries the DCI #2. The UE may apply a DL Rx beam 214 to monitor the CORESET 215.

Each of the DL Rx beams 212 and 214 may correspond to a TCI-state of a TCI-state table in an RRC configuration. In some implementations, the RRC configuration of the cell #1 may be configured with a TCI-state table, while the RRC configuration of the cell #2 is not configured with any TCI-state table. Examples of the related RRC configurations are shown in Tables 5 and 6.

TABLE 5

| RRC Configuration of Cell #1 |
| --- |
| RRC configuration of cell #1<br>ControlResourceSet::{<br>.<br>.<br>.<br>    - CORESETID<br>      - #1<br>    - TCI-statesPDCCH:<br>      - TCI-state#1<br>    - TCI-presentInDCI:<br>      - disable<br>.<br>.<br>.<br>}<br>ControlResourceSet::{<br>.<br>.<br>.<br>    - CORESETID<br>      - #2<br>    - TCI-statesPDCCH:<br>      - TCI-state#5<br>    - TCI-presentInDCI:<br>      - enable<br>.<br>.<br>.<br>}<br>PDSCH-config::{<br>.<br>.<br>.<br>  - TCI-state:{<br>.<br>.<br>.<br>    - TCI-stateID:<br>      - #10<br>    - CellID:<br>      - Cell#2<br>    - referenceSignal:<br>      CRI#10<br>.<br>.<br>.<br>  }<br>.<br>.<br>.<br>}<br>PDSCH-config::{<br>.<br>.<br>. |

TABLE 5-continued

| RRC Configuration of Cell #1 |
| --- |
|   - TCI-state:{<br>.<br>.<br>.<br>    - TCI-stateID:<br>      - #1<br>    - CellID:<br>      - Cell#1<br>    - referenceSignal:<br>      - CRI#1<br>.<br>.<br>.<br>  }<br>.<br>.<br>.<br>}<br>PDSCH-config::{<br>.<br>.<br>.<br>  - TCI-state:{<br>.<br>.<br>.<br>    - TCI-stateID:<br>      - #5<br>    - CellID:<br>      - Cell#1<br>    - referenceSignal:<br>      - SSB#5<br>.<br>.<br>.<br>  }<br>.<br>.<br>.<br>} |

TABLE 6

| RRC Configuration of Cell #2 |
| --- |
| RRC configuration of cell #2<br>Crosscarrierscheduling::{<br>.<br>.<br>.<br>  -schedulingCellID:<br>    - Cell#1<br>  -cif-InSchedulingCell:<br>    - 1<br>  -default-TCI-StatesPDCCH-cross:<br>    - TCI-state#10<br>.<br>.<br>.<br>} |

As shown in FIG. 2B, the UE may apply the DL Rx beam 212 and the DL Rx beam 214 to receive the CORESET 213 and the CORESET 215, respectively. The DL Rx beam 212 and the DL Rx beam 214 may be determined by TCI-state IDs contained in the CORESET configuration (e.g., "ControlResourceSet"). For example, according to Table 5, the DL Rx beam 212 may be determined by the TCI-state #1, which is associated with the CRI #1, and the DL Rx beam 214 may be determined by the TCI-state #5, which is associated with the SSB #5.

During the scheduling offset period (e.g., from the time T232 to the time T234) of the CORESET 215, the UE may receive and buffer the PDSCH on the cell #2 based on a DL Rx spatial filter (e.g., the DL Rx beam 218) indicated by a specific IE (e.g., "default-TCI-StatesPDCCH-cross" in Table 6) contained in the RRC configuration of the cell #2. As discussed above, if the UE is not configured with a TCI-state table of the cell #2, the UE may refer to the TCI-state table of the cell #1 to determine the TCI-state (e.g., the TCI-state #10 associated with the CRI #10 in Table 5) for the cell #2. It should be noted that from the time T232 to the time T233, the UE may need to turn on both of the RF module #1 and the RF module #2 to activate two different DL Rx beams (e.g., the DL Rx beams 216 and 218) at the same time. In some implementations, if the UE cannot support the function of such simultaneous reception, the UE may apply a DL Rx beam configured for the cell #1 to perform reception on the cell #2.

Figure 3:
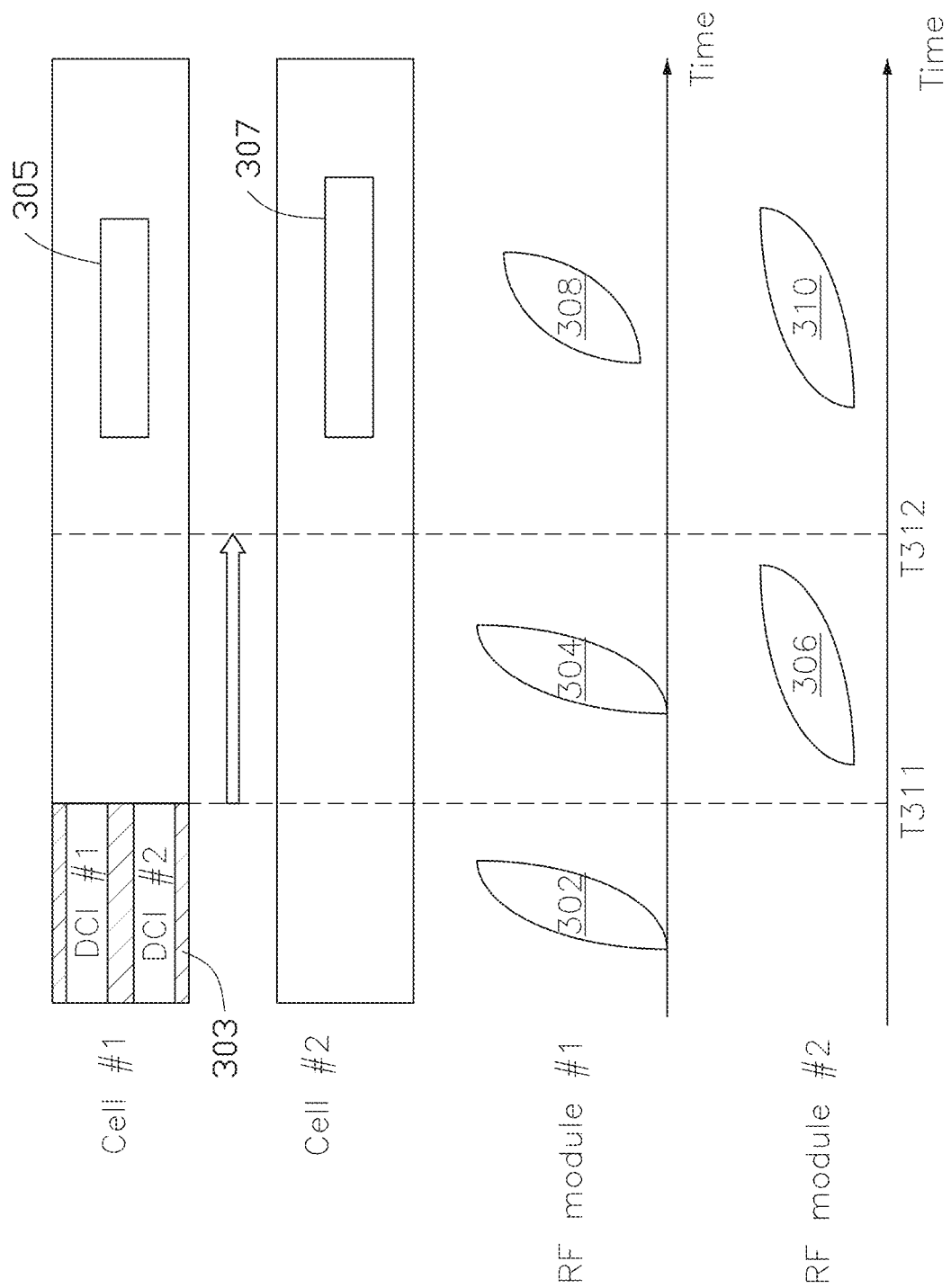
FIG. 3 is a schematic diagram illustrating a cross-carrier scheduling procedure performed with beam operations, in accordance with example implementations of the present disclosure.

FIG. 3 is a schematic diagram illustrating a cross-carrier scheduling procedure performed with beam operations, in accordance with example implementations of the present disclosure.

As shown in FIG. 3, a UE is configured to perform CA transmissions on a cell #1 and a cell #2 of a base station, for example. The UE may have an RF module #1 and an RF module #2 to receive the cell #1 and the cell #2, respectively. The cell #2 (scheduled cell) may be cross-carrier scheduled on the cell #1 (scheduling cell). Since the cell #2 is a scheduled cell, the base station may not configure a CORESET configuration on the cell #2.

In the present implementation, the cell #1 may be configured with a CORESET 303 by the base station. The UE may apply a DL Rx beam 302 to monitor the CORESET 303 on the cell #1. The DL Rx beam 302 may correspond to a TCI-state configured in an RRC configuration. For example, the UE may receive a configuration of the CORESET 303 (CORESET configuration) from the base station through an RRC signaling. The CORESET configuration may include a TCI-state ID associated with the TCI-state. Thus, the UE may follow such a CORESET configuration to apply a DL Rx spatial filter (e.g., the DL Rx beam 302) corresponding to the TCI-state to receive the CORESET 303. On the other hand, in the present implementation, the CORESET 303 may contain a PDCCH that carries the DCI #1 and another PDCCH that carries the DCI #2. For example, the DCI #1 may contain the scheduling information of a PDSCH 305 on the cell #1, and the DCI #2 may contain the scheduling information of a PDSCH 307 on the cell #2.

Examples of the related RRC configurations are shown in Tables 7 and 8.

TABLE 7

RRC Configuration of Cell #1

RRC configuration of cell #1
ControlResourceSet::{
.
.
.
-TCI-statesPDCCH:
- TCI-state#1
-TCI-PresenInDCI:
- disable
-CORESETID:
- #1
.
.
.
}

TABLE 8

RRC Configuration of Cell #2

RRC configuration of cell #2
Crosscarrierscheduling:: {
.
.
.
-schedulingCellId:
- Cell#1
-cif-InSchedulingCell:
- 1
-default-TCI-StatesPDCCH-cross:
- TCI-state#10
.
.
.
}

During the scheduling offset period (e.g., from the time T311 to the time T312) of the CORESET 303, the UE may apply a DL Rx beam 304 and a DL Rx beam 306 to receive the PDSCH 305 on the cell #1 and the PDSCH 307 on the cell #2, respectively. The DL Rx beam 304 may be determined by the predefined rule. The DL Rx beam 306 may be determined by a specific IE (e.g., "default-TCI-StatesPDCCH-cross") contained in a cross-carrier scheduling configuration (e.g., "CrossCarrierScheduling-Config") of an RRC signaling (e.g., an RRC configuration).

In some implementations, the specific IE (e.g., "default-TCI-StatesPDCCH-cross") may include a TCI-state ID (e.g., "TCI-state #10" in Table 8). The TCI-state ID may refer to a TCI-state of a TCI-state table configured in an RRC configuration of the scheduling cell (e.g., the cell #1). In some other implementations, the UE may be configured with a complete TCI-state table, in a case that there are lots of different TCI References (RSs) of the scheduled cell, and the base station cannot configure all of the different TCI RSs in the TCI-state table of the scheduling cell. In some of such implementations, the TCI-state table may be configured in a PDSCH configuration (e.g., "PDSCH-Config"). The TCI-state table may include one or more TCI RS sets for representing different DL Rx beams (e.g., different Rx spatial filters) for the UE. In some other implementations, the DL Rx beam for the scheduled cell may correspond to a fixed TCI-state of a TCI-state table. For example, the DL Rx beam may correspond to the first TCI-state of the TCI-state table. In some other implementations, if the specific IE (e.g., "default-TCI-StatesPDCCH-cross") is configured in the cross-carrier scheduling configuration, the TCI-state ID of the specific IE may refer to a TCI-state table of the scheduled cell. Such implementations may be used when the "TCI-PresentInDCI" IE is set as enable (which means that an indication of the DL Rx beam for receiving the PDSCH is present in the DCI). The base station may use different DL Rx beams for different cells based on the TCI index in the DCI.

After the time T312, the UE may decode the DCI #1 and the DCI #2 successfully. The UE may follow the DCI #1 to apply a DL Rx beam 308 to receive the PDSCH 305 on the cell #1, and follow the DCI #2 to apply a DL Rx beam 310 to receive the PDSCH 307 on the cell #2.

Figure 4:
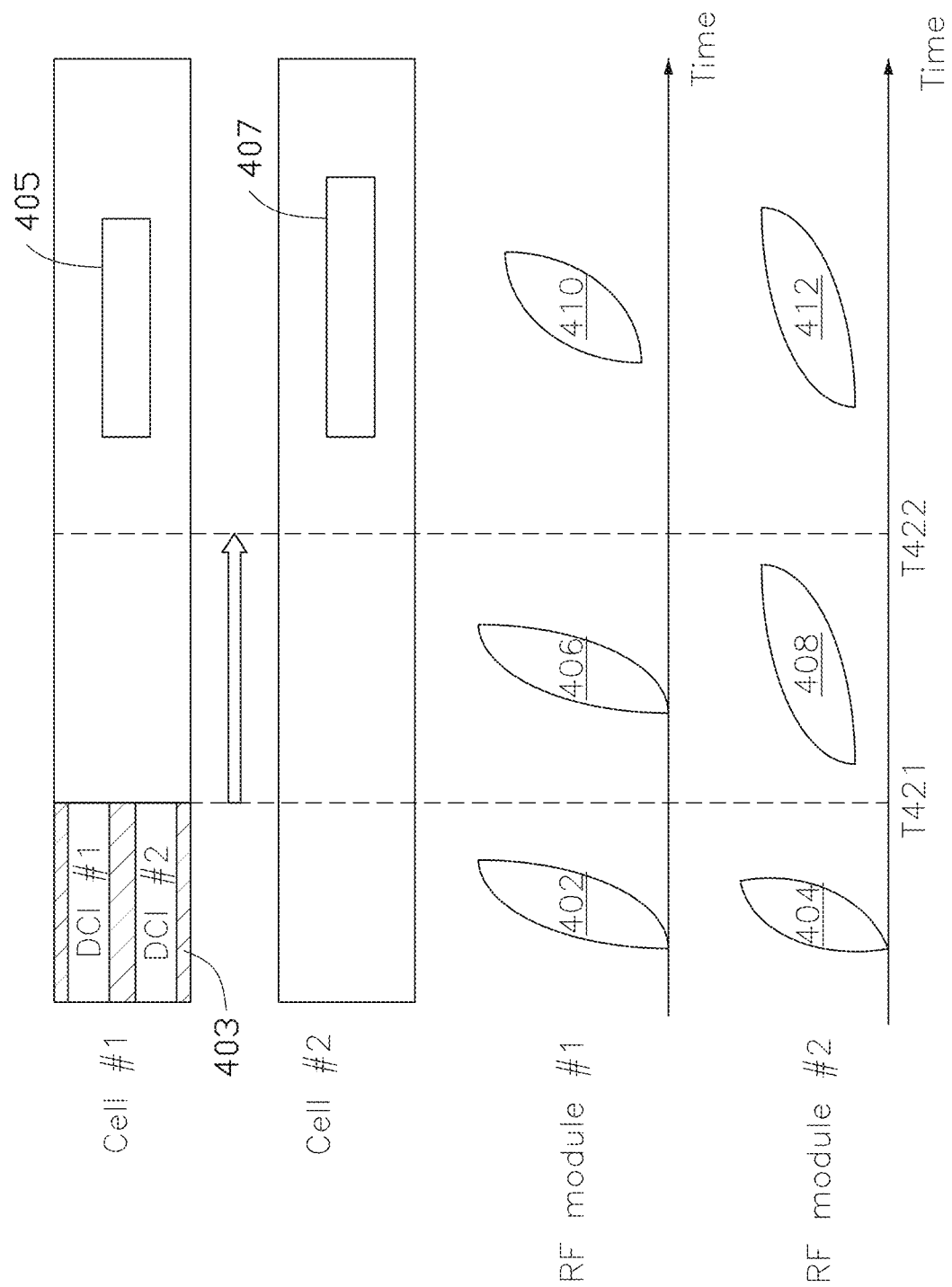
FIG. 4 is a schematic diagram illustrating a cross-carrier scheduling procedure performed with beam operations, in accordance with example implementations of the present disclosure.

FIG. 4 is a schematic diagram illustrating a cross-carrier scheduling procedure performed with beam operations, in accordance with example implementations of the present disclosure. In the present implementation, a UE may be configured with multiple TCI-states in a CORESET configuration from a base station, for example. For example, the configuration of the CORESET 403 (CORESET configuration) may include multiple TCI-state IDs. The UE may apply two of the TCI-state IDs to receive the PDCCHs on the cell #1 and the cell #2 simultaneously. For example, the CORESET configuration may include a first TCI-state ID (e.g., associated with the DL Rx beam 402) and a second TCI-state ID (e.g., associated with the DL Rx beam 404). If the UE has the ability to perform simultaneous reception, the UE may apply the DL Rx beams 402 and the DL Rx beam 404 to monitor the CORESET 403 at the same time, as shown in FIG. 4.

During the scheduling offset period (e.g., from the time T421 to the time T422) of the CORESET 403, the UE may apply a DL Rx beam 406 and a DL Rx beam 408 to receive the PDSCH 405 on the cell #1 and the PDSCH 407 on the cell #2, respectively. The DL Rx beam 406 may be determined by the predefined rule. The DL Rx beam 408 may be determined by a specific IE (e.g., "default-TCI-StatesPDCCH-cross") contained in a cross-carrier scheduling configuration (e.g., "CrossCarrierScheduling-Config") of an RRC signaling.

After the time T422, the UE may decode the DCI #1 and the DCI #2 successfully. Based on the DCI #1 and DCI #2, the UE may apply a DL Rx beam 410 and a DL Rx beam 412 to receive the PDSCH 405 on the cell #1 and the PDSCH 407 on the cell #2, respectively. As illustrated in Tables 3 and 4, each of the DCI #1 and the DCI #2 may indicate a TCI-state for the corresponding cell. In some implementations, the mapping between the TCI-state(s) and the cell(s) may have a one-to-one mapping relationship based on the order of the cell IDs.

In some implementations, for multiple TRP transmission, one CORESET configuration may contain multiple TCI states, and one TCI state is for one TRP. For example, if the base station schedules the PDSCH of a TRP #1 and the PDSCH of a TRP #2 only on a CORESET, the base station may configure two different TCI-states in the configuration of the CORESET (CORESET configuration). Each TCI-state may correspond to a DL Rx spatial filter. For example, according to the two TCI-states configured in the CORESET configuration, the UE may monitor the PDSCHs from the TRP #1 and the TRP #2, during the scheduling offset period, with two corresponding DL Rx spatial filters. Meanwhile, in some implementations, the order rule between the TRP ID(s) and the TCI-state(s) may have a one-to-one mapping relationship based on the order of the TRP IDs.

It should be noted that although there are two cells (e.g., the cell #1 and the cell #2) are shown in the figures, the present disclosure is not limited thereto. In some implementations, multiple cells may be cross-carrier scheduled on a cell. For example, in a case that the UE performs CA transmissions on more than two cells (e.g., three cells), the scheduling-cell-to-scheduled-cell mapping may have a one-to-two mapping relationship. In some of such implementations, each scheduled cell may be associated with a TCI-state ID of the default-TCI-StatesPDCCH-cross IE. For example, if a cell #N+1 and a cell #N+2 are cross-carrier scheduled on a cell #N, and the cell #N+1 and the cell #N+2 are associated with the TCI-state #5 and the TCI-state #6, respectively, then these TCI-state IDs (e.g., the TCI-state #5 and the TCI-state #6) may be configured in the cross-carrier scheduling configuration. In some of such implementations, the TCI-state for the DL Rx beam may refer to a TCI-state of the scheduled cells or the scheduling cells in the same approach as the single scheduled cell case mentioned above.

According to the present disclosure, another challenge of cross-carrier scheduling is monitoring a CORESET for Beam Failure Recovery (BFR) (hereafter referred to as "BFR CORESET") for the scheduled cell. In some implementations, a configuration of BFR (BFR configuration) may be included in an RRC configuration of the scheduled cell (e.g., the cell #2). The BFR configuration may include (or be associated with) detailed information such as the number of Physical Resource Blocks (PRBs), the number of symbols, and the Control Channel Element (CCE) to Resource Element Group (REG) mapping. The UE may monitor the response of Beam Failure Recovery reQuest (BFRQ) on the BFR CORESET, no matter whether the function of cross-carrier scheduling is enabled or not. Meanwhile, if the UE is not configured with a BFR CORESET, or is configured only with a CORESET index, the UE may monitor a preconfigured CORESET on a specific cell for BFR, or based on the COERSET index to find the corresponding CORESET on the specific cell. The preconfigured CORESET may be configured by an RRC configuration. The specific cell may have a cell ID configured in the CrossCarrierScheduling-Config IE for cross-carrier scheduling.

In some other implementations, the UE may monitor the BFR CORESET on a cell other than the scheduling cell. In some of such implementations, the UE may be configured with a specific IE (e.g., "CrossCarrierScheduling-BFR") contained in the BFR configuration to indicate on which cell the UE may monitor the BFR CORESET. The configuration of the BFR CORESET may be based on the cell where the UE monitors the BFR CORESET.

In some implementations, the UE may receive the BFR configuration from the base station via an RRC signaling. The BFR configuration may include a search space ID of a search space configuration associated with a CORESET for BFR (hereafter referred to as "BFR CORESET") configured on a specific cell other than the scheduled cell. In some implementations, the search space configuration may include at least one of 1) a number of Physical Resource Blocks (PRBs), 2) a number of symbols, and 3) a Control Channel Element (CCE) to Resource Element Group (REG) mapping. In some implementations, the specific cell may be a scheduling cell. In some other implementations, the specific cell may be a self-scheduling cell other than the scheduling cell.

Figure 5:
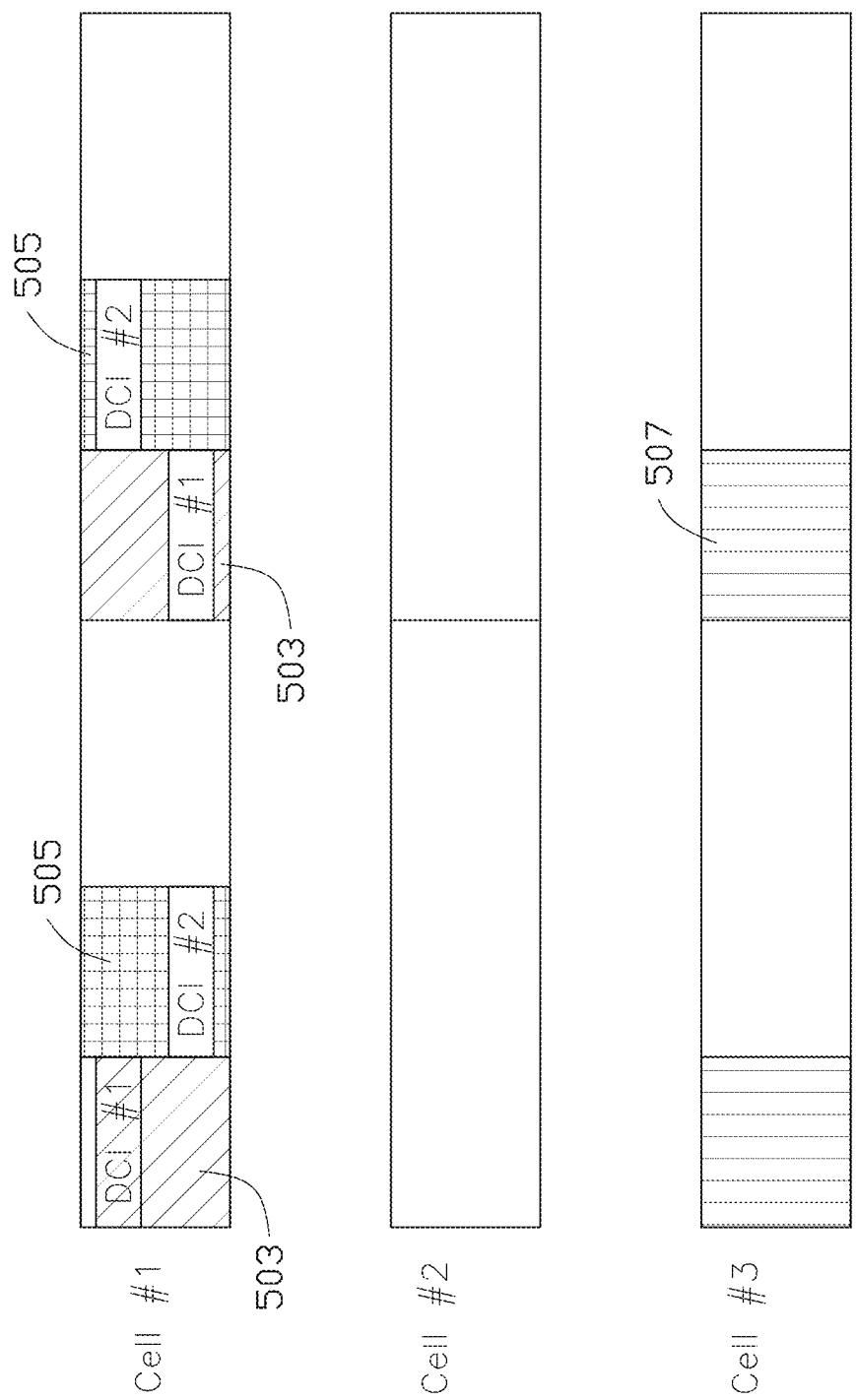
FIG. 5 is a schematic diagram illustrating a cross-carrier scheduling procedure performed with beam operations, in accordance with example implementations of the present disclosure.

FIG. 5 is a schematic diagram illustrating a cross-carrier scheduling procedure performed with beam operations, in accordance with example implementations of the present disclosure. In the present implementation, the BFR CORESET is configured on a self-scheduling cell.

As shown in FIG. 5, a UE may be configured to perform CA transmissions on multiple cells #1, #2 and #3 of a base station, for example. The cell #1 may be configured with a CORESET 503 containing the DCI #1 and a CORESET 505 containing the DCI #2. The cell #2 may be cross-carrier scheduled by the cell #1, and may not be configured with any CORESET by the base station. The cell #3 may be a self-scheduling cell other than the cell #1.

In the present implementation, the cell #3 may be configured with a BFR CORESET 507. The UE may monitor the BFR CORESET 507, on the cell #3, for the cell #2. For example, when a beam failure event occurs on the cell #2, the UE may transmit a BFRQ to the base station, and monitor the response of the BFRQ on the BFR CORESET 507 based on a BFR configuration (e.g., "BeamFailureRecoveryConfig"). Examples of the related configurations are shown in Tables 9, 10, and 11.

TABLE 9

| RRC Configuration of Cell #1 |
|---|
| RRC configuration of cell #1<br>ControlResourceSet::{<br>  .<br>  .<br>  .<br>    - CORESETID<br>      - #1<br>    - TCI-statesPDCCH:<br>      - TCI-state#1<br>    - TCI-presentInDCI:<br>      - disable<br>  .<br>  .<br>  .<br>}<br>ControlResourceSet::{<br>  .<br>  .<br>  .<br>    - CORESETID<br>      - #2<br>    - TCI-statesPDCCH:<br>      - TCI-state#5<br>    - TCI-presentInDCI:<br>      - enable<br>  .<br>  .<br>  .<br>} |

TABLE 10

| RRC Configuration of Cell #2 |
|---|
| RRC configuration of cell #2<br>Crosscarrierscheduling::{<br>  .<br>  .<br>  .<br>  -schedulingCellId:<br>    - Cell#1<br>  -cif-InSchedulingCell:<br>    - 1<br>  -default-TCI-StatesPDCCH-cross:<br>    - TCI-state#10<br>  .<br>  .<br>  .<br>}<br>BeamFailureRecoveryConfig::{<br>  .<br>  .<br>  .<br>  -Crosscarrierscheduling-BFR::{<br>    .<br>    .<br>    .<br>      - schedulingCellId:<br>        - Cell#3<br>      - cif-InSchedulingCell:<br>        - 2<br>    .<br>    .<br>    .<br>  }<br>  .<br>  .<br>  .<br>} |

TABLE 11

| RRC Configuration of Cell #3 |
|---|
| RRC configuration of cell #3<br>BeamFailureRecoveryConfig::{<br>  .<br>  .<br>  .<br>  -recoveryControlResource-Config:<br>    - frequencyDomainResources:<br>    - duration:<br>  .<br>  .<br>  .<br>  -Recoverysearchspace-Config:<br>    - monitor-periodicity<br>  .<br>  .<br>  .<br>} |

Figure 6:
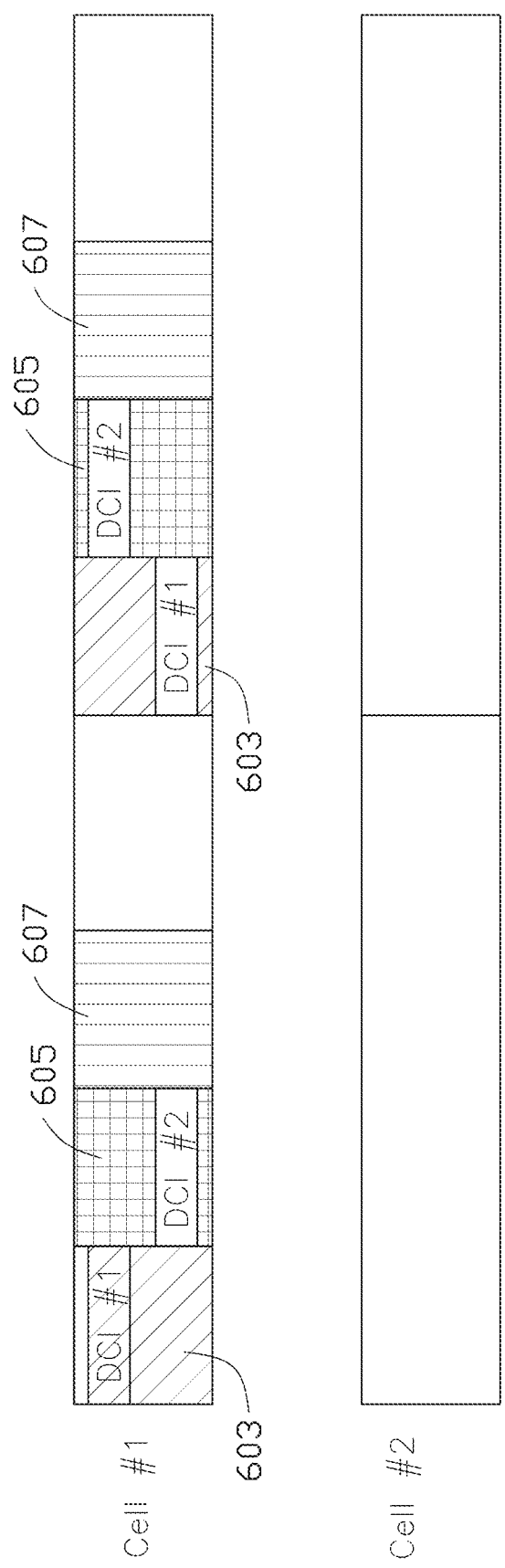
FIG. 6 is a schematic diagram illustrating a cross-carrier scheduling procedure performed with beam operations, in accordance with example implementations of the present disclosure.

FIG. 6 is a schematic diagram illustrating a cross-carrier scheduling procedure performed with beam operations, in accordance with example implementations of the present disclosure. In the present implementation, the BFR CORESET is configured on a scheduling cell.

As shown in FIG. 6, a scheduling cell (e.g., the cell #1) may be configured with a CORESET 603 containing DCI #1, a CORESET 605 containing DCI #2, and a BFR CORESEET 607. A cell #2 may be a scheduled cell which is cross-carrier scheduled by the cell #1.

When a beam failure event occurs on the cell #2, the UE may transmit a BFRQ to the base station, and monitor the response of the BFRQ on the BFR CORESET 607 based on a BFR configuration contained in an RRC signaling (e.g., an RRC configuration).

According to the present disclosure, another challenge of cross-carrier scheduling is monitoring the CORESET(s). In some implementations, the UE may be configured with additional configuration(s) by the base station to restrict the search space(s) and the CORESET(s) needed to be monitored for the scheduled cell(s). For example, the UE may be configured with an additional CORESET and/or an additional search space configuration in the cross-carrier scheduling configuration (e.g., "Crosscarrierscheduling"). The additional CORESET configuration may include, for example, CORESET ID(s) corresponding to the CORESET ID(s) configured for the scheduling cell. On the other hand, the additional search space configuration may include, for example, at least one of the following: 1) the number of PDCCH candidates of each Aggregation Level (AL), 2) the monitoring periodicity, and 3) the format of DCI to be monitored. The configuration format of the additional CORESET and the search space configurations may reuse the CORESET and search space configurations designed for a PDCCH configuration.

Examples of the related RRC configurations are shown in Tables 12 and 13.

TABLE 12

| RRC Configuration of Cell #1 |
|---|
| RRC configuration of cell #1<br>ControlResourceSet::{<br>  .<br>  .<br>  .<br>    - CORESETID:<br>      - #1 |

TABLE 12-continued

RRC Configuration of Cell #1

```
 .
 .
 .
}
ControlResourceSet::{
 .
 .
 .
    - CORESETID:
      - #2
 .
 .
 .
}
ControlResourceSet::{
 .
 .
 .
    - CORESETID:
      - #3
 .
 .
 .
}
```

TABLE 13

RRC Configuration of Cell #2

```
RRC configuration of cell #2
Crosscarrierscheduling::{
 .
 .
 .
    - schedulingCellId
      - Cell#1
    - cif-InSchedulingCell:
      - 1
    - ControlResourceset-cross
      - CORESET#3
    -nrofCandidates
      - AL4
      - AL8
 .
 .
 .
}
```

As shown in Tables 12 and 13, the scheduling cell (e.g., the cell #1) is configured with three CORESETs: CORESET #1, CORESET #2 and CORESET #3. The scheduled cell (e.g., the cell #2), which is cross-carrier scheduled on the scheduling cell, is configured with a partial CORESET/search space configuration in the cross-carrier scheduling configuration (e.g., "Crosscarrierscheduling").

Figure 7:
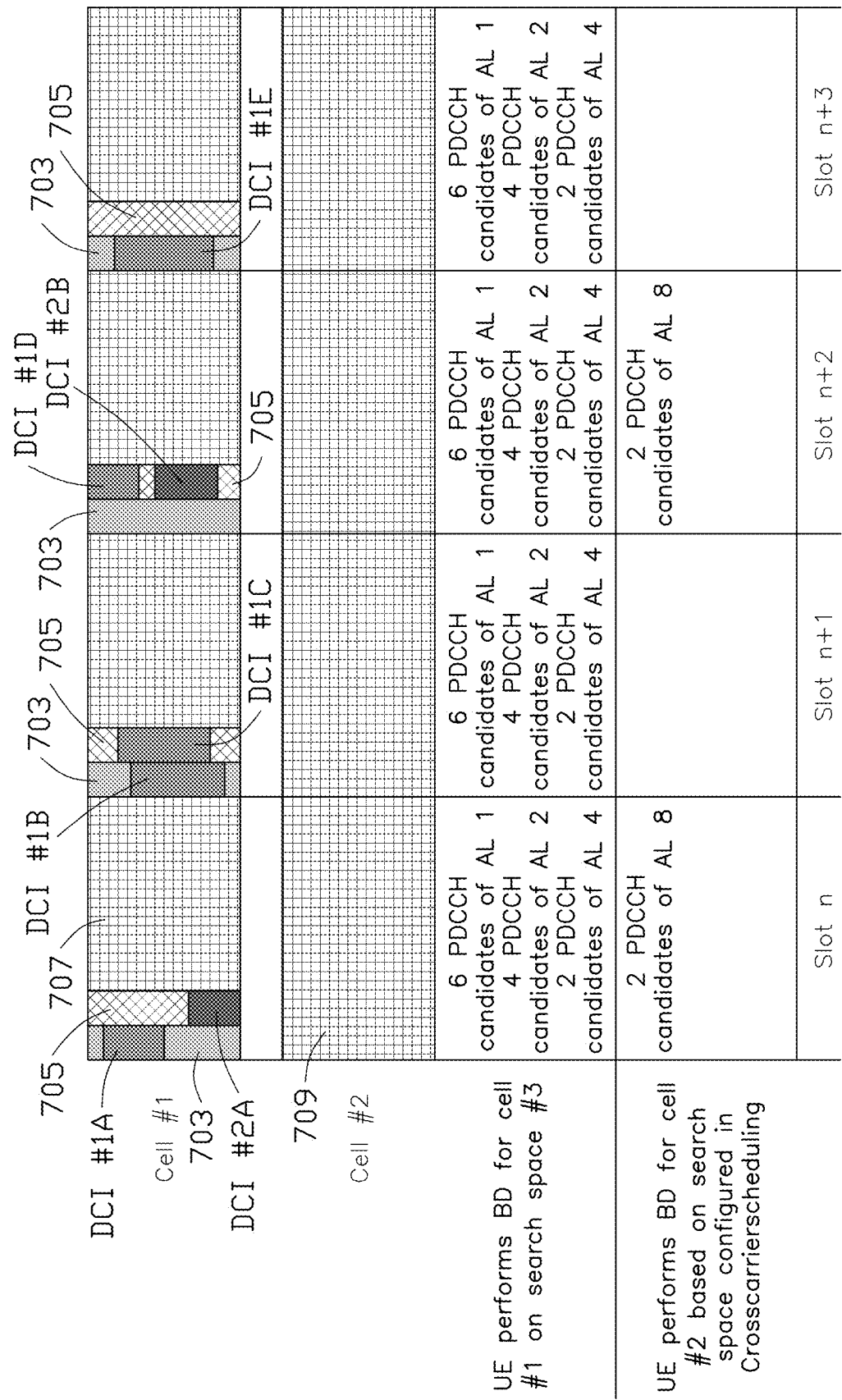
FIG. 7 is a schematic diagram illustrating a UE monitoring PDCCH candidates for a scheduled cell on a scheduling cell, in accordance with example implementations of the present disclosure.

FIG. 7 is a schematic diagram illustrating a UE monitoring PDCCH candidates for a scheduled cell on a scheduling cell of a base station, in accordance with example implementations of the present disclosure. In the present implementation, a UE may perform Blind Decoding (BD) for the scheduling cell (e.g., a cell #1) based on different search space configurations to monitor the PDCCH(s) of the scheduling cell and the PDCCH(s) of the scheduled cell (e.g., a cell #2). For example, the UE may receive, on the cell #1, a plurality of search space configurations from the base station. The plurality of search space configurations may include a first search space configuration and a second search space configuration, where a portion of the second search space configuration may be different from the first search space configuration. The UE may then monitor, on the cell #1, the PDCCH(s) of the scheduling cell and the PDCCH(s) of the scheduled cell (e.g., the cell #2) based on the first search space configuration and the second search space configuration, respectively. In some implementations, the portion of the second search space configuration differing from the first search space configuration may include at least one of: 1) a number of PDCCH candidates of each AL, 2) a monitoring periodicity, and 3) a format of DCI. In some implementations, the first search space configuration and the second search space configuration may be associated with the same or different CORESET IDs. In some implementations, the first search space configuration and the second search space may be associated with the same search space ID.

As shown in FIG. 7, the UE may be configured to perform CA transmission on the cell #1 and the cell #2 of the base station, for example. Meanwhile, the cell #2 (scheduled cell) is configured to be cross-carrier scheduled on the cell #1 (scheduling cell). Since the cell #2 is the scheduled cell, the cell #2 may not be configured with any CORESET configuration by the base station. On the other hand, the cell #1 may be configured with two CORESETs: CORESET 703 and CORESET 705, by the base station. Examples of the related configurations are shown in Tables 14 and 15:

TABLE 14

RRC Configuration of Cell #1

```
RRC configuration of cell #1
ControlResourceSet::{
 .
 .
 .
    -CORESETID
      - #1
    -TCI-statesPDCCH:
      - TCI-state#1
    -TCI-presentInDCI:
      - disable
 .
 .
 .
}
ControlResourceSet::{
 .
 .
 .
    -CORESETID
      - #2
    -TCI-statesPDCCH:
      - TCI-state#5
    -TCI-presentInDCI:
      - enable
 .
 .
 .
}
SearchSpace-config::{
 .
 .
 .
    -SearchSpaceID:
      - #3
    -CORESETID
      - #2
    -Monitor-periodicity:
      - 1 slot
    -PDCCH-candidate:
      - AL 1: 6
      - AL 2: 6
      - AL 4: 1
      - AL 8: 0
 .
 .
 .
}
```

TABLE 15

| RRC Configuration of Cell #2 |
| --- |
| RRC configuration of cell #2<br>Crosscarrierscheduling::{<br>.<br>.<br>.<br>    -schedulingCellId:<br>        - Cell#1<br>    -cif-InSchedulingCell:<br>        - 1<br>    -CORESET-config-cross:<br>        - CORESETID<br>            - #2<br>    -SearchSpace-config:<br>        -Monitor-periodicity:<br>            - 2 slots<br>    -PDCCH-candidate:<br>        - AL 1: 0<br>        - AL 2: 0<br>        - AL 4: 0<br>        - AL 8: 2<br>.<br>.<br>.<br>} |

As shown in Tables 14 and 15, in addition to the search space configuration (e.g., "SearchSpace-config" in Table 14) contained in the RRC configuration of the cell #1, the UE may be further configured with an additional search space configuration (e.g., "SearchSpace-config" in Table 15) with the monitor periodicity (e.g., "Monitor-periodicity") and the number of PDCCH candidates (e.g., "PDCCH-candidate") in the cross-carrier scheduling configuration (e.g., "Crosscarrierscheduling").

In the present implementation, the UE may determine the PDCCH monitoring occasion based on the monitor periodicity of each the search space of each cell. For example, based on the search space configuration (e.g., "SearchSpace-config") of the RRC configuration of the cell #1, the UE may monitor the search space #3 in the CORESET #2 (e.g., the CORESET 705 in FIG. 7) in every time slot (e.g., time slots n, n+1, n+2 and n+3). The UE may perform BD based on the number of PDCCH candidates for each AL. For example, according to Table 14, the UE may decode the PDCCH candidates of AL1, AL2 and AL4, and each AL may have different number of PDCCH candidates.

On the other hand, since the UE is configured to perform cross-carrier scheduling for the cell #2, the UE may also determine the PDCCH monitoring occasion for the cell #2 on the cell #1. For example, based on the search space configuration (e.g., "SearchSpace-config" in Table 15) in the cross-carrier scheduling configuration (e.g., "Crosscarrierscheduling" in Table 15), the UE may monitor the search space for the cell #2 in the CORESET #2 in every two time slots, and the UE may perform BD based on the number of PDCCH candidates of each AL. For example, according to Table 15, the UE may decode the PDCCH candidate of AL8, and AL8 has two PDCCH candidates.

After the UE performs BD for the cell #1 and the cell #2, the UE may find the scheduling information for the cell #1 (e.g., the DCI #1A, #1B, #1C, #1D and #1E) and the scheduling information for the cell #2 (e.g., the DCI #2A and #2B) in the CORESET 703 and the CORESET 705.

It should be noted that the RRC configurations mentioned above may be suspend when the corresponding scheduled/scheduling cell is deactivated. If the RRC configuration itself is still valid, the UE may implicitly apply the RRC configuration when the corresponding scheduled/scheduling cell is activated again. In some other implementations, the RRC configurations may be released when the corresponding scheduled/scheduling cell is deactivated, and the base station may need to reconfigure the RRC configuration when the corresponding scheduled/scheduling cell is activated again.

Figure 8:
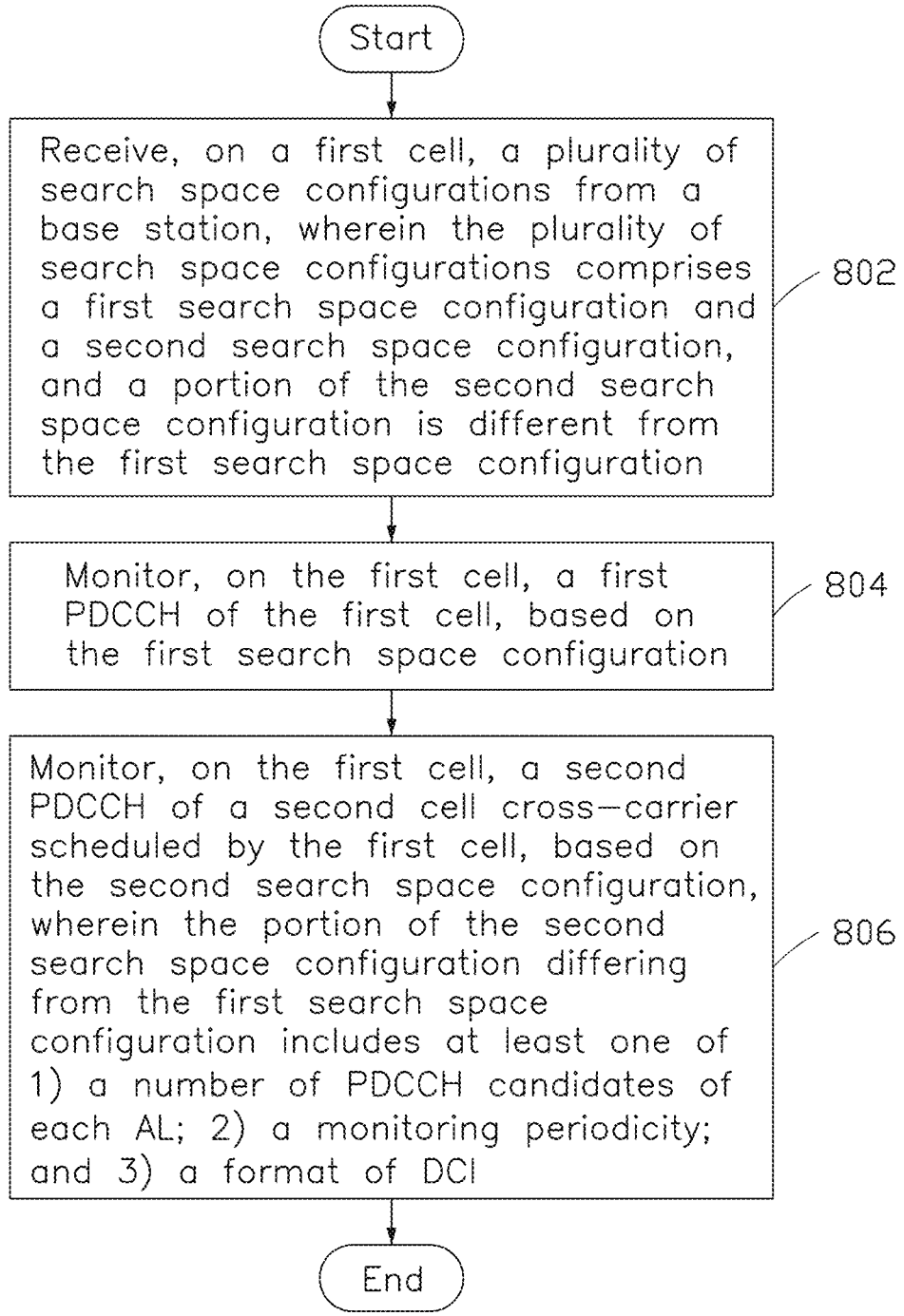
FIG. 8 is a flowchart of a method for performing cross-carrier scheduling with beam operations, in accordance with example implementations of the present disclosure.

FIG. 8 is a flowchart of a method for performing cross-carrier scheduling with beam operations, in accordance with example implementations of the present disclosure. As shown in FIG. 8, the flowchart includes actions 802, 804 and 806.

In action 802, a UE may receive, on a first cell (e.g., a scheduling cell), a plurality of search space configurations from a base station. The plurality of search space configurations may include a first search space configuration and a second search space configuration. A portion of the second search space configuration may be different from the first search space configuration.

In some implementations, the first search space configuration and the second search space configuration may be associated with a same CORESET ID. In some other implementations, the first search space configuration and the second search space configuration may be associated with different CORESET IDs.

In some implementations, the first search space configuration and the second search space may be associated with the same search space ID. For example, as shown in Tables 14 and 15, the search space configuration (e.g., the first search space configuration) in the RRC configuration of the cell #1 may be associated with a search space ID of #3. On the other hand, the search space configuration (e.g., the second search space configuration) in the RRC configuration of the cell #2 may include only a portion of IEs listed in the first search space configuration. In such a case, the second search space configuration may be implicitly associated with the same search space ID (e.g., the search space ID of #3) as the first search space configuration.

In action 804, the UE may monitor, on the first cell, a first PDCCH of the first cell, based on the first search space configuration.

In action 806, the UE may monitor, on the first cell, a second PDCCH of a second cell (e.g., a scheduled cell) cross-carrier scheduled by the first cell, based on the second search space configuration. In some implementations, the portion of the second search space configuration differing from the first search space configuration may include at least one of a number of PDCCH candidates of each AL, a monitoring periodicity, and a format of DCI.

Figure 9:
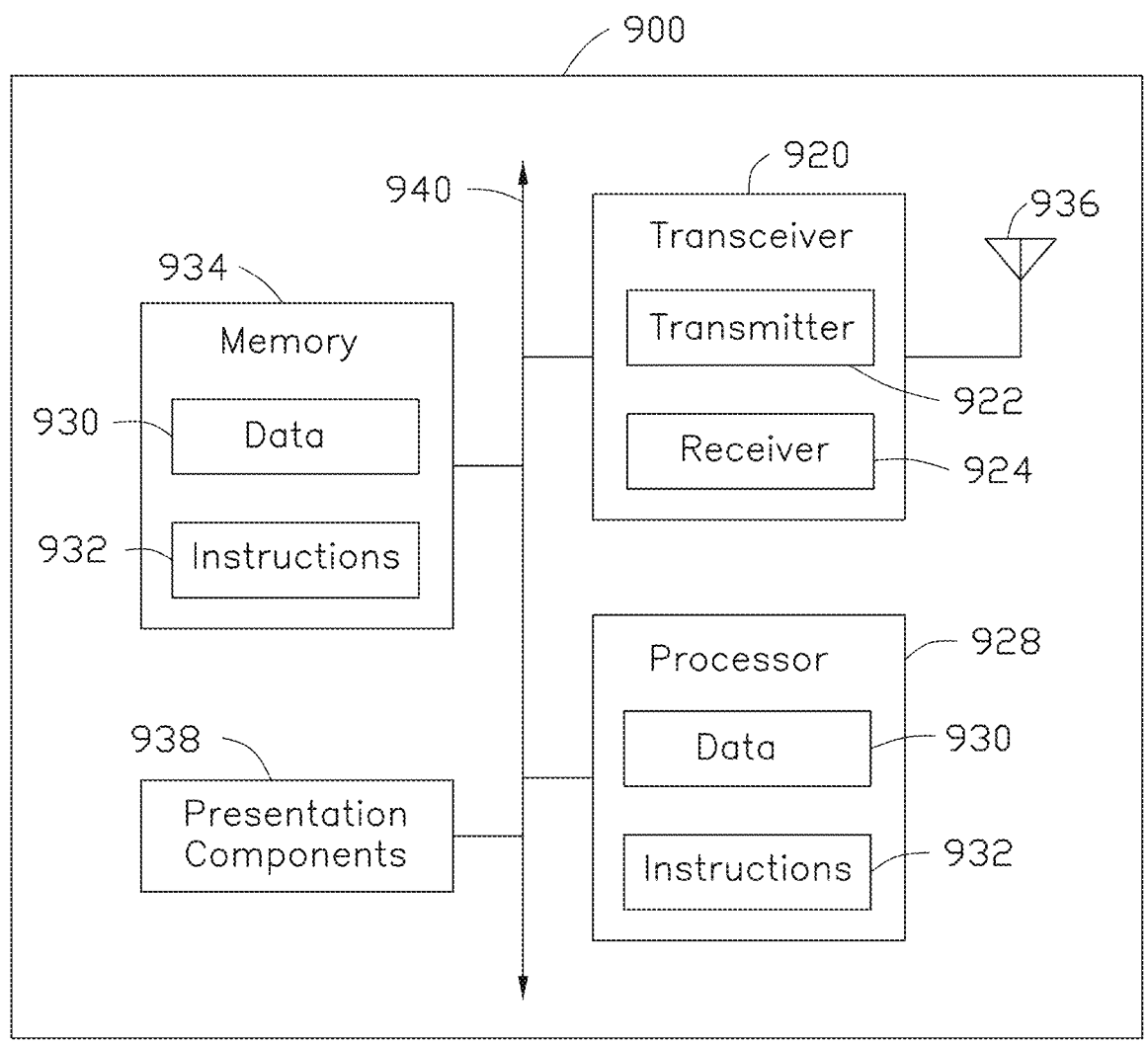
FIG. 9 is a block diagram illustrating a node for wireless communication, in accordance with various aspects of the present application.

FIG. 9 is a block diagram illustrating a node for wireless communication, in accordance with various aspects of the present application. As shown in FIG. 9, a node 900 may include a transceiver 920, a processor 928, a memory 934, one or more presentation components 938, and at least one antenna 936. The node 900 may also include an RF spectrum band module, a base station communications module, a network communications module, and a system communications management module, Input/Output (I/O) ports, I/O components, and power supply (not explicitly shown in FIG. 9). Each of these components may be in communication with each other, directly or indirectly, over one or more buses 940. In one implementation, the node 900 may be a UE or a base station that performs various functions described herein, for example, with reference to FIGS. 1 through 8.

The transceiver 920 having a transmitter 922 (e.g., transmitting/transmission circuitry) and a receiver 924 (e.g., receiving/reception circuitry) may be configured to transmit and/or receive time and/or frequency resource partitioning information. In some implementations, the transceiver 920 may be configured to transmit in different types of subframes and slots including, but not limited to, usable, non-usable and flexibly usable subframes and slot formats. The transceiver 920 may be configured to receive data and control channels.

The node 900 may include a variety of computer-readable media. Computer-readable media can be any available media that can be accessed by the node 900 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 934 may include computer-storage media in the form of volatile and/or non-volatile memory. The memory 934 may be removable, non-removable, or a combination thereof. Exemplary memory includes solid-state memory, hard drives, optical-disc drives, and etc. As illustrated in FIG. 9, The memory 934 may store computer-readable, computer-executable instructions 932 (e.g., software codes) that are configured to, when executed, cause the processor 928 to perform various functions described herein, for example, with reference to FIGS. 1 through 8. Alternatively, the instructions 932 may not be directly executable by the processor 928 but be configured to cause the node 900 (e.g., when compiled and executed) to perform various functions described herein.

The processor 928 (e.g., having processing circuitry) may include an intelligent hardware device, e.g., a Central Processing Unit (CPU), a microcontroller, an ASIC, and etc. The processor 928 may include memory. The processor 928 may process the data 930 and the instructions 932 received from the memory 934, and information through the transceiver 920, the base band communications module, and/or the network communications module. The processor 928 may also process information to be sent to the transceiver 920 for transmission through the antenna 936, to the network communications module for transmission to a core network.

One or more presentation components 938 presents data indications to a person or other device. Exemplary presentation components 938 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for wireless communications performed by a User Equipment (UE), the method comprising:
   receiving, on a first cell, a first Radio Resource Control (RRC) configuration of the first cell and a second RRC configuration of a second cell that is cross-carrier scheduled by the first cell, the first RRC configuration comprising a first search space configuration and a first search space Identifier (ID) of the first search space configuration, the second RRC configuration comprising a second search space configuration;
   monitoring, on the first cell, a first Physical Downlink Control Channel (PDCCH) of the first cell, based on the first search space configuration; and
   monitoring, on the first cell, a second PDCCH of the second cell based on the second search space configuration, wherein:
   the second search space configuration is indicated by the first search space ID of the first search space configuration;
   a portion of the second search space configuration is different from the first search space configuration; and
   the portion of the second search space configuration different from the first search space configuration comprises at least one of:
   a number of PDCCH candidates of each Aggregation Level (AL);
   a monitoring periodicity; and
   a format of Downlink Control Information (DCI).

2. The method of claim 1, wherein the first search space configuration and the second search space configuration are associated with a same Control Resource Set (CORESET) ID.

3. The method of claim 1, wherein the first search space configuration and the second search space configuration are associated with different Control Resource Set (CORESET) IDs.

4. The method of claim 1, further comprising:
   receiving, by the UE, a Beam Failure Recovery (BFR) configuration from a base station via Radio Resource Control (RRC) signaling, the BFR configuration comprising a second search space ID of a third search space configuration associated with a Control Resource Set (CORESET) configured on a specific cell other than the second cell.

5. The method of claim 4, wherein the specific cell is the first cell or a self-scheduling cell other than the first cell.

6. The method of claim 4, wherein the third search space configuration comprises at least one of:
   a number of Physical Resource Blocks (PRBs);
   a number of symbols; and
   a Control Channel Element (CCE) to Resource Element Group (REG) mapping.

7. The method of claim 1, further comprising:
receiving, by the UE, a CORESET configuration from a base station, the CORESET configuration comprising a plurality of Transmission Configuration Indication (TCI) state IDs.

8. The method of claim 7, further comprising:
applying, by the UE, two of the plurality of TCI state IDs to receive the first PDCCH and the second PDCCH simultaneously.

9. A User Equipment (UE) comprising:
one or more non-transitory computer-readable media having computer-executable instructions embodied thereon;
at least one processor coupled to the one or more non-transitory computer-readable media, and configured to execute the computer-executable instructions to:
receive, on a first cell, a first Radio Resource Control (RRC) configuration of the first cell and a second RRC configuration of a second cell that is cross-carrier scheduled by the first cell, the first RRC configuration comprising a first search space configuration and a first search space Identifier (ID) of the first search space configuration, the second RRC configuration comprising a second search space configuration;
monitor, on the first cell, a first Physical Downlink Control Channel (PDCCH) of the first cell, based on the first search space configuration; and
monitor, on the first cell, a second PDCCH of the second cell based on the second search space configuration, wherein:
the second search space configuration is indicated by the first search space ID of the first search space configuration;
a portion of the second search space configuration is different from the first search space configuration; and
the portion of the second search space configuration different from the first search space configuration comprises at least one of:
a number of PDCCH candidates of each Aggregation Level (AL);
a monitoring periodicity; and
a format of Downlink Control Information (DCI).

10. The UE of claim 9, wherein the first search space configuration and the second search space configuration are associated with a same Control Resource Set (CORESET) ID.

11. The UE of claim 9, wherein the first search space configuration and the second search space configuration are associated with different Control Resource Set (CORESET) IDs.

12. The UE of claim 9, wherein the at least one processor is further configured to execute the computer-executable instructions to:
receive a Beam Failure Recovery (BFR) configuration from a base station via Radio Resource Control (RRC) signaling, the BFR configuration comprising a second search space ID of a third search space configuration associated with a Control Resource Set (CORESET) configured on a specific cell other than the second cell.

13. The UE of claim 12, wherein the specific cell is the first cell or a self-scheduling cell other than the first cell.

14. The UE of claim 12, wherein the third search space configuration comprises at least one of one of:
a number of Physical Resource Blocks (PRBs);
a number of symbols; and
a Control Channel Element (CCE) to Resource Element Group (REG) mapping.

15. The UE of claim 9, wherein the at least one processor is further configured to execute the computer-executable instructions to:
receive a CORESET configuration from a base station, the CORESET configuration comprising a plurality of Transmission Configuration Indication (TCI) state IDs.

16. The UE of claim 15, wherein the at least one processor is further configured to execute the computer-executable instructions to:
apply two of the plurality of TCI state IDs to receive the first PDCCH and the second PDCCH simultaneously.

* * * * *